Dec. 24, 1940.    A. SPRUNG    2,225,891
REMOVABLE HANDLE FOR CONTAINERS
Filed March 8, 1940
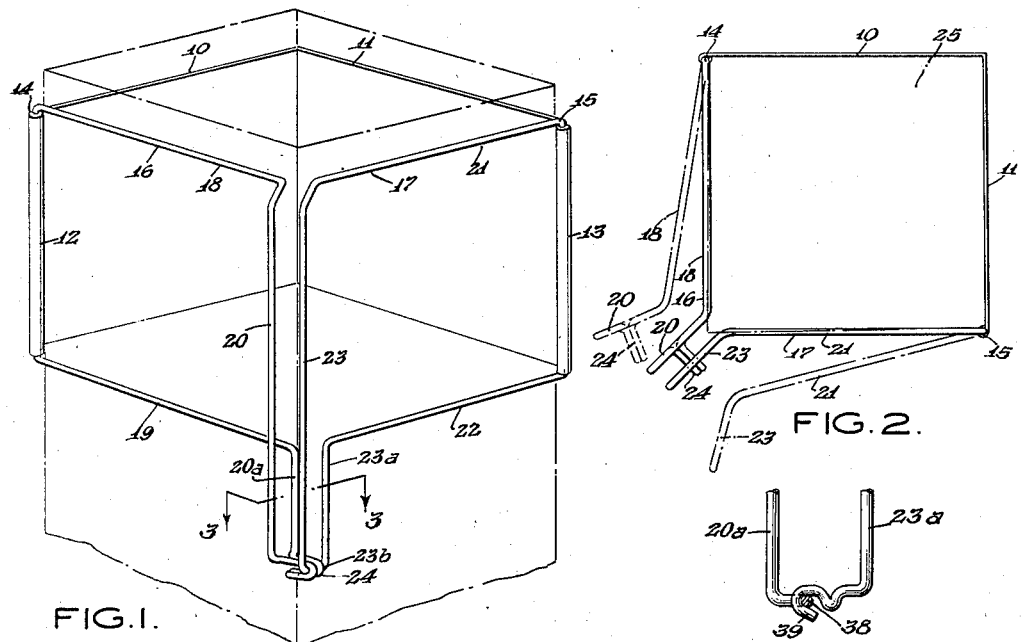
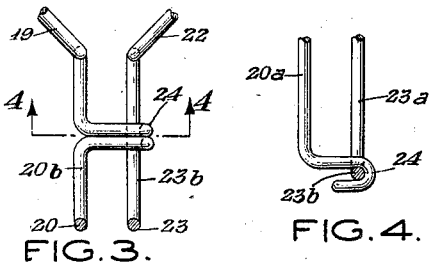
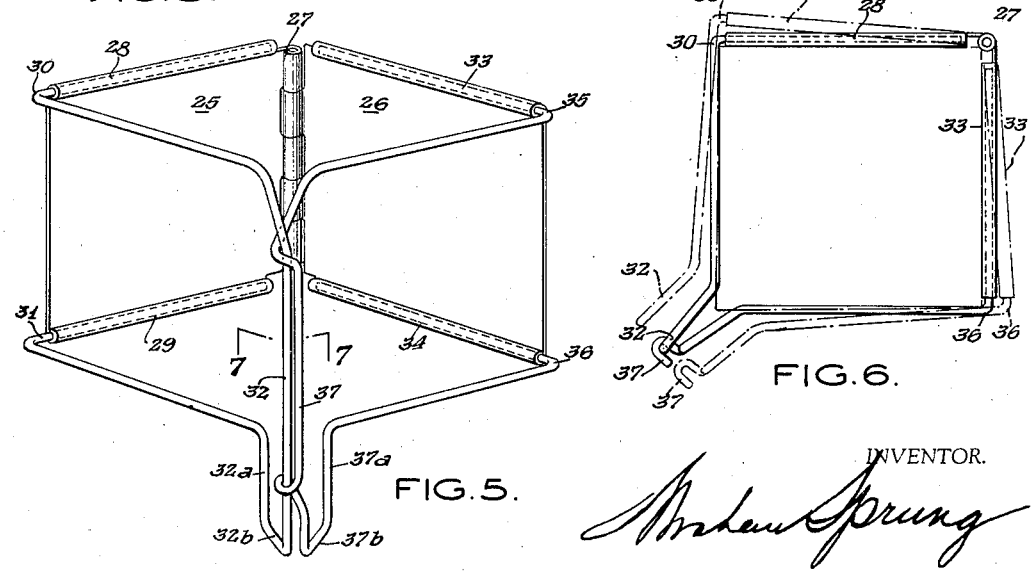
INVENTOR.
Abraham Sprung Patented Dec. 24, 1940

2,225,891

UNITED STATES PATENT OFFICE 2,225,891

REMOVABLE HANDLE FOR CONTAINERS

Abraham Sprung, Brooklyn, N. Y.

Application March 8, 1940, Serial No. 322,979

11 Claims. (Cl. 294—33)

This invention relates to handles and more particularly to removable handles for containers.

Such liquid commodities as milk, oil, etc., and powdered commodities as sugar, salt, etc., are commonly sold in containers made of card-board or other flexible material, having an opening from which its contents may be poured when desired. These containers have been found in practice to be difficult to manipulate due partly to their weight and partly, especially as regards milk containers, to the fact that their outer surface is highly paraffined, making it difficult to obtain a firm hold upon them, especially when it is necessary to tilt them, for pouring.

With this in view, it is the main object of my invention to provide a removable handle for these and similar containers, by means of which they can be manipulated with ease and readily tilted for pouring.

Another object of this invention is to provide a detachable handle for containers, which can be attached to a container with a minimum of effort, and which can be removed at will, to be attached to another container.

Still another advantage of this invention resides in providing a removable handle for containers with means for locking it securely about a container, the locking means being so arranged, as to permit of instant disengagement, whenever desired.

Yet another aim of this invention is in the provision of a detachable handle for containers, so constructed as to exert pressure upon the container which it engages, and thus to attain a firm hold thereon, eliminating the possibility of its sliding about the container.

A still further aim resides in the provision of a removable handle with one or more of its surfaces adapted to carry legends, such as advertising matter, thereon.

Another object of the invention lies in the provision of a removable handle for containers of card-board or other compressible material, which is inexpensive to manufacture, easy to attach and remove and which is highly efficient in its operation.

These and other meritorious objects are attained by the novel construction and combination of few and simple parts, hereinafter described and illustrated in the accompanying drawing, forming a material component of this disclosure, and in which:

Figure 1 is a perspective view of the removable handle, mounted upon a container, the container being indicated in broken lines;

Figure 2 is a top plan view of the invention, the solid lines indicating the handle locked about a container, and the broken lines showing it in a released position;

Figure 3 is a fragmentary, sectional view, taken on line 3—3 of Figure 1.

Figure 4 is a sectional view of the locking member, the section being taken on line 4—4 of Figure 3.

Figure 5 is a perspective view of a modified form of detachable handle for containers;

Figure 6 is a view similar to Figure 2, showing the modified structure closed in solid lines, and released in broken lines;

Figure 7 is a sectional view, the section being taken on line 7—7 of Figure 5; and Figure 8 is a fragmentary view of a modified locking member for the handle.

Referring in greater detail to the drawing, Figure 1 shows the container handle as comprising a plate of metal or other suitable material, bent at a point halfway its length substantially at a right angle, to form two members 10 and 11 respectively.

The outer ends of the members 10 and 11 are curled along their vertical edges to form hollow, substantially cylindrical portions 12—13 to receive and pivotally retain upright posts 14—15 of a pair of resilient handles generally indicated by the numerals 16 and 17.

Handle 16 has a pair of outwardly extending parallel arms 18—19 spaced apart by substantially the width of plate 10, the outer end of the arms curved to form a gripping element 20.

In a similar manner, handle 17 is provided with outwardly extending parallel arms 21—22 spaced apart by substantially the width of member 11 of the rectangular plate and the end of arms 21—22 is curved to form a gripping element 23.

Substantially at its lowermost point, gripping member 20 is formed into a hook 24 which, when in operative engagement with handle 23 as indicated at 23b, securely locks the handle about a container, forming a compound handle.

The modified form of structure illustrated in Figures 5, 6 and 7 comprises two plates 25—26 of equal size joined by a hinge 27.

The upper and lower edges of plate 25 are curled to form hollow, substantially cylindrical portions 28—29 to receive a pair of resilient, outwardly extending arms 30—31 of a handle parallel and spaced apart substantially the width of the plates. At the points where the arms extend from the cylindrical portions, they are bent substantially at right angles and terminate in a gripping element 32.

In a similar manner, the upper and lower edges of plate 26 are curled to form hollow, substantially cylindrical portions 33—34 to receive a pair of outwardly extending arms 35—36 of a handle, the arms being parallel and spaced substantially the width of the plate. Where the arms extend from the cylindrical portion, they are bent at substantially right angles and terminate in a gripping element 37.

Figure 8 illustrates a modified locking member, especially adapted for use in connection with the structure shown in Figure 1, wherein gripping member 23 is provided with a recess 38 with which hook 39 on the other gripping member can be joined in locking engagement.

In operative use, a hand of the user must be entered between the container and the compound handle. In order to provide ample space therefor, the lower parts of the gripping elements are turned downwardly below the lower of the parallel arms, as indicated at 20a and 23a in Figure 1, and at 32a and 37a in Figure 5, which latter figure also indicates at 32b and 37b that the lowermost edges of gripping elements 32 and 37 are bent to form substantially rectangular cross-sections.

In operation, a cardboard container, or a container made of any other compressible material, indicated in the drawing at 25, is so positioned, that the corner above which the dispensing opening is located is embraced at the rectangular bend of the plate. The arms are then caused to embrace the remainder of the container. In order to lock the resilient handle securely in place, it is necessary to slightly raise gripping element 20 and slightly depress gripping element 23 to permit hook 24 to engage portion 23b of gripping element 23 as indicated in the drawing, and thus form a compound handle. Obviously a reversal of this procedure will permit detachment of the handle.

The modified structure illustrated in Figure 5 is used in practically the same manner as the device illustrated in Figure 1. In order to securely lock this handle about a container, gripping member 37 is caused to slip under and then over gripping member 32 to be removably retained, as indicated in Figure 5 and to form a compound handle. Disengagement is effected by reversing this procedure.

In Figure 2 the device is shown to be so constructed that it impinges the container thereby producing a firm hold on the container and eliminates the possibility of its sliding along the container.

While the foregoing is illustrative and descriptive of the best known embodiments of the invention, it is in nowise to be considered as limitative thereof, it being clearly understood that further modifications can be made without the exercise of inventive faculties, and within the scope and spirit of the claims hereunto appended without departure from the spirit of the present invention. For instance, when a handle is to be constructed for use in connection with circular containers, the plate being shown in Figure 1 as bent at a right angle, will be arcuately curved to conform to the shape of the circular container, and the arms also would be curved. An appropriate and obvious modification of the shape of the structure will be made, when multi-angled containers are to be used in connection therewith. Similar minor and obvious modifications would be made in the structure illustrated in Figure 5 to attain the same result.

Having thus described the invention, what is claimed as new and desired to secure by Letters Patent, is:

1. In a removable holder for containers, a body portion adapted to engage the sides of a container, pivotally arranged means for detachably retaining said body portion around a container, and means for detachably locking said body portion around a container.

2. A detachable holder for containers comprising a body portion, a pair of resilient frame members retained at opposite edges thereof, each of said frame members terminating in a pressure element, and means for detachably engaging said pressure elements around a container.

3. A removable handle for containers comprising a body portion adapted to engage two or more sides of a container, gripping elements pivotally retained at opposite edges of said body portion and means for detachably locking said gripping elements about a container to form a compound handle.

4. A detachable holder for containers comprising a body portion adapted to partly surround a container, a pair of frame members pivotally retained at opposite edges thereof, each of said frame members terminating in a gripping element, and means for detachably locking said gripping elements to form a compound handle.

5. A removable handle for containers comprising a rectangularly formed plate, gripping elements pivotally retained at opposite edges of said plate, and means for detachably locking and positively retaining said gripping elements around a container to form a compound handle.

6. A removable handle for containers comprising a rectangularly formed plate adapted to fit the sides of a container, resilient frame members pivotally retained at opposite edges of said plate terminating in a gripping element, and means for detachably locking said gripping elements around a container to form a compound handle.

7. A detachable handle for containers comprising a rectangularly formed plate, a pair of resilient frame members pivotally retained at opposite vertical edges of said plate, each of said frame members terminating in a pressure gripping element, and means for detachably locking said pressure gripping elements to form a compound handle.

8. A removable holder for containers comprising a rectangularly formed plate, vertical bearings at the opposite edges thereof, a pair of frame members pivotally retained in said bearings, each of said frame members terminating in a gripping element, and means for detachably locking said gripping elements around a container to form a compound handle.

9. A detachable holder for compressible containers including a rigid plate conforming in shape and adapted to partly surround the container, a pair of frame members pivotally retained in vertical bearings opposing vertical edges of said plate, said frame members terminating in pressure gripping elements, and means for locking said elements around a container to form a compound handle.

10. A removable handle for containers comprising a formed plate, vertical retaining means at opposite edges thereof, a pair of frame members pivotally retained therein, each of said frame members terminating in a gripping element, one of said gripping elements provided with locking means adapted for engagement with the other gripping element for detachably locking said gripping elements around a container to form a compound handle.

11. A detachable holder for containers including a rigid plate, conforming in shape and adapted to partly surround the container, a pair of frame members pivotally retained in opposite vertical bearings of said plate, each of said frame members terminating in a gripping element, one of said elements being provided with a hook for interlocking in detachable engagement with the other element.

ABRAHAM SPRUNG.